United States Patent
Kong et al.

(10) Patent No.: US 8,125,454 B2
(45) Date of Patent: Feb. 28, 2012

(54) RESISTIVE TYPE TOUCH PANEL

(75) Inventors: Nam Yong Kong, Seongnam-shi (KR); Tae Ho You, Incheon-Kwangyokshi (KR); Hee Jeong Park, Bucheon-shi (KR)

(73) Assignee: LG Display Co., Ltd., Seoul (KR)

( * ) Notice: Subject to any disclaimer, the term of this patent is extended or adjusted under 35 U.S.C. 154(b) by 703 days.

(21) Appl. No.: 10/952,633

(22) Filed: Sep. 29, 2004

(65) Prior Publication Data

US 2005/0110772 A1     May 26, 2005

(30) Foreign Application Priority Data

Nov. 24, 2003   (KR) .................. 10-2003-0083690

(51) Int. Cl.
*G06F 3/041*     (2006.01)

(52) U.S. Cl. ................................... 345/173
(58) Field of Classification Search ........... 345/173–179
See application file for complete search history.

(56) References Cited

U.S. PATENT DOCUMENTS

| | | | | |
|---|---|---|---|---|
| 5,956,020 A | * | 9/1999 | D'Amico et al. | 345/173 |
| 2001/0000961 A1 | * | 5/2001 | Hikida et al. | 345/173 |
| 2002/0094660 A1 | * | 7/2002 | Getz et al. | 438/455 |
| 2002/0149571 A1 | * | 10/2002 | Roberts | 345/174 |
| 2003/0141118 A1 | * | 7/2003 | Kakuno | 178/18.01 |
| 2003/0201985 A1 | * | 10/2003 | Katakami | 345/173 |
| 2004/0090426 A1 | * | 5/2004 | Bourdelais et al. | 345/173 |
| 2004/0090429 A1 | * | 5/2004 | Geaghan et al. | 345/173 |

* cited by examiner

*Primary Examiner* — Amr Awad
*Assistant Examiner* — Dennis Joseph
(74) *Attorney, Agent, or Firm* — Brinks Hofer Gilson & Lione (57) ABSTRACT

A resistive type touch panel includes a first substrate aligned to be facing a second substrate. The first substrate includes a first conductive layer and the second substrate includes a second conductive layer. A plurality of spacers each having a polygonal column shape are disposed between the first and second substrates in predetermined positions. The geometry and center-to-center spacing of the spacers minimizes detection of a distributed activation force applied to one of the first and second substrate while still providing sensitivity to detect concentrated application of an activation force to one of the first and second substrates.

16 Claims, 6 Drawing Sheets

| film | A-type film | | | | B-type film | | | |
|---|---|---|---|---|---|---|---|---|
| shape | spherical shape | | hexahedral shape | | spherical shape | | hexahedral shape | |
| Center-to-center distance(mm) | 0.5 | 0.7 | 0.5 | 0.7 | 0.5 | 0.7 | 0.5 | 0.7 |
| activation force(g) pen | 115 | 141 | 357 | 137 | 161 | 139 | 259 | 229 |
| hand | 281 | 200 | 2.5k | 265 | 308 | 221 | 2.5k | 658 |

FIG. 9

FIG. 10

RESISTIVE TYPE TOUCH PANEL

PRIORITY CLAIM

This application claims the benefit of the Korean Application No. P2003-83690 filed on Nov. 24, 2003, which is hereby incorporated by reference.

BACKGROUND

1. Technical Field

The present invention relates to a touch panel, and more particularly, to a resistive type touch panel that is configured to distinguish between inadvertent contact with the touch panel and desired selection of a displayed item.

2. Related Art

Touch panels are widely integrated with display surfaces of display devices such as electronic calculators, liquid crystal display (LCD) devices, plasma display panel (PDP) devices, electroluminescence (EL) devices, and cathode ray tubes (CRTs). Touch panels may be classified into an analog resistive type, a capacitive type, and an EM (Electro-magnetic) type. In general, touch panels are capable of sensing the location on the display surface where a user contacts the display surface with an object such as a pen, a finger, etc. Contact with the display surface results in the generation of a location specific input signal. Based on the information currently displayed, and the particular location where the display surface was touched by the user, the input signal may be converted to input data, such as an input instruction to direct the operation of a computer device. In some applications, a touch screen may be used in place of remote controllers or other input devices that are external to the display device. For example, using a touch panel integrated into a display device, a user may select desired information with a pen or a hand while observing an image displayed by the display device.

Generally, touch panels are provided with upper and lower transparent substrates, each having electrodes formed thereon. The upper and lower transparent substrates may be bonded to each other within a predetermined space. If a surface of the upper transparent substrate is touched at a predetermined point using input means, e.g., a finger, a pen, etc., the electrode formed on the upper transparent substrate electrically connects to the electrode formed on the lower transparent substrate. A voltage, made variable by a resistance value or a capacitance value of the touched point, is then detected and outputted along with a location defined by coordinates of the touched point.

In a capacitive type touch panel, a film having a transparent electrode is formed on an LCD panel. A voltage applied to each corner of the film generates a uniform electric field in the transparent electrode. Thus, a voltage drop is generated when a predetermined point of a display surface is touched with an input means such as finger or conductive stylus, thereby detecting coordinates of the touched point.

Figure 1:
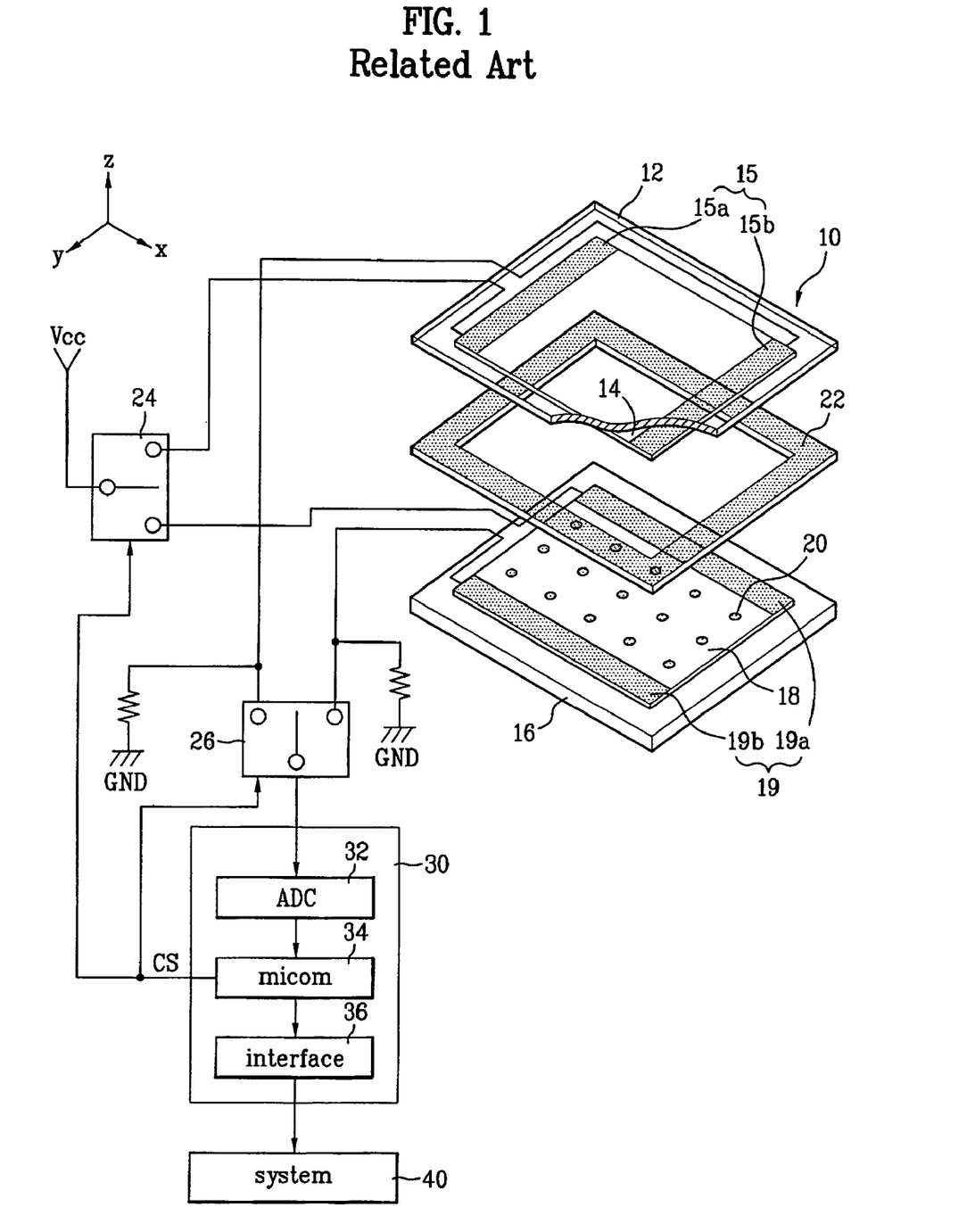
FIG. 1 is a schematic view illustrating a resistive type touch panel according to the related art.

FIG. 1 is a schematic view illustrating a resistive type touch panel device according to the related art. As shown in FIG. 1, the touch panel device includes a touch panel 10, a touch panel controller 30, and a system 40. The touch panel 10 outputs a coordinate signal representative of a touched point on a display. The touch panel controller 30 drives the touch panel 10. In addition, the touch panel controller 30 determines coordinates according to the coordinate signal provided by the touch panel 10. The touch panel controller 30 also outputs the value of the coordinates to the system 40. In response to the value of the coordinates from the touch panel controller 30, the system 40 may perform a corresponding command.

The touch panel 10 includes an upper film 12 and a lower film 16. A first transparent conductive layer 14 is formed on a lower surface of the upper film 12, and a second transparent conductive layer 18 is formed on an upper surface of the lower film 16. An adhesive may be used to bond the upper film 12 and the lower film 16. The adhesive may be applied to a peripheral area of the upper and lower films 16 that is a non-touch area. When bonded, a predetermined distance is maintained between the upper film 12 and the lower film 16. The predetermined distance corresponds to a thickness of the adhesive 22.

Prior to bonding, a plurality of dot spacers 20 are formed on the first transparent conductive layer 14 of the upper film 12 or the second transparent conductive layer 18 of the lower film 16. The dot spacers 20 maintain the predetermined distance between the upper film 12 and the lower film 16 during and following bonding. The dot spacers 20 are disposed in a touch area of the upper film 12. As previously discussed, the upper film 12 is subject to touching by a user with, for example a pen or finger.

The upper film 12 may be formed of a transparent film such as a Polyethylene Terephtalate (PET) film. The lower film 16 may also be formed of a transparent film, such as a glass substrate or a plastic substrate of the same material as the upper film 12. The first and second transparent conductive layers 14 and 18 may be formed of a conductive material such as Indium-Tin-Oxide (ITO), Indium-Zinc-Oxide (IZO) and Indium-Tin-Zinc-Oxide (ITZO).

The illustrated touch panel 10 includes an X-electrode bar 15 and a Y-electrode bar 19. The X-electrode bar 15 is in contact with the first transparent conductive layer 14 to apply a voltage to the first transparent conductive layer 14 according to an X-axis direction. The Y-electrode bar 19 is in contact with the second transparent conductive layer 18 to apply a voltage to the second transparent conductive layer 18 according to a Y-axis direction. The X-electrode bar 15 includes a first X-electrode bar 15a for applying a driving voltage Vcc to form a current according to the X-axis direction, and a second X-electrode bar 15b for applying a ground voltage GND. The Y-electrode bar 19 includes a first Y-electrode bar 19a for applying a driving voltage Vcc to form a current according to the Y-axis direction, and a second Y-electrode bar 19b for applying a ground voltage GND.

During operation, when the upper film 12 of the touch panel 10 is touched with a pen or a finger, the first transparent conductive layer 14 is brought into contact with the second transparent conductive layer 18. In response to the contact, a resistance value is varied at the touching point according to a surface resistance of the first and second transparent conductive layers 14 and 18. As a result, the current or the voltage is varied according to the varied resistance value. The varied voltage or current may provide the X-axis coordinate signal. The X-axis coordinate signal is output through the first or second Y-electrode bar 19a or 19b that is in contact with the second transparent conductive layer 18. Alternatively, the varied voltage or current may provide the Y-axis coordinate signal. The Y-axis coordinate signal is output through the first or second X-electrode bar 15a or 15b that is in contact with the first transparent conductive layer 14. In the illustrated example, the touch panel 10 may sequentially output the X-axis coordinate signal and the Y-axis coordinate signal under control of the touch panel controller 30.

Specifically, the driving voltage Vcc and the ground voltage GND may be provided to the X-electrode bar 15 through a first switch 24 included in the touch panel 10. In response to the varied resistance value in the touching point of the first and second transparent conductive layers 14 and 18, the X-axis coordinate signal may be output through the second Y-electrode bar 19b and a second switch 26 included in the touch panel 10. On the other hand, the driving voltage Vcc and the ground voltage GND may be provided to the Y-electrode bar 19 through the first and second switches 24 and 26. In response to the varied resistance value at the touching point of the first and second transparent conductive layers 14 and 18, the Y-axis coordinate signal may be output through the second X-electrode bar 15b.

The first switch 24 provides the driving voltage Vcc to the first X-electrode bar 15a or the first Y-electrode bar 19a in response to a control signal CS from the touch panel controller 30. The second switch 26 outputs the voltage of the touching point or provides the ground voltage GND to the second X-electrode bar 15b or the second Y-electrode bar 19b in response to the control signal CS of the touch panel controller 30. The touch panel controller 30 detects the X-Y coordinate value of the touching point output from the touch panel 10, and provides the X-Y coordinates to the system 40. As a result, the touch panel controller 30 controls the first and second switches 24 and 26 according to an X-axis coordinate mode and a Y-axis coordinate mode, and provides power source (Vcc and GND) for the touch panel 10.

The touch panel controller 30 includes an analog-digital converter (hereinafter, referred to as ADC) 32, a micom 34 and an interface 36. The ADC 32 converts the X-axis and Y-axis coordinate signals to digital data. The micom 34 detects the coordinate value by combining the X-axis and Y-axis coordinate data. In addition, the micom 34 outputs the coordinate value to the interface 36. The interface 36 provides the coordinate value to the system 40.

When the coordinate values are provided sequentially by the touch panel 10, the ADC 32 converts the X-axis coordinate signal and the Y-axis coordinate signal to digital data, and then outputs the digital data. The micom 34 combines the X-axis coordinate data and the Y-axis coordinate data sequentially provided from the ADC 32 to detect the coordinate value of the touching point. The coordinate value detected by the micom 34 is provided to the system 40 through the interface 36. The micom 34 may also periodically generate the control signal CS to control the operation of the first switch 24 and the second switch 26.

The system 40 detects the coordinate value from the touch panel controller 30 and may perform a corresponding command or an applied program. The system 40 also provides a power source signal and video data for the display. Thus, the touch panel device detects the coordinate value touched by a pen or a finger, transmits the coordinate value to the system 40, and the system 40 performs the corresponding command according to the coordinate value.

Figure 2:
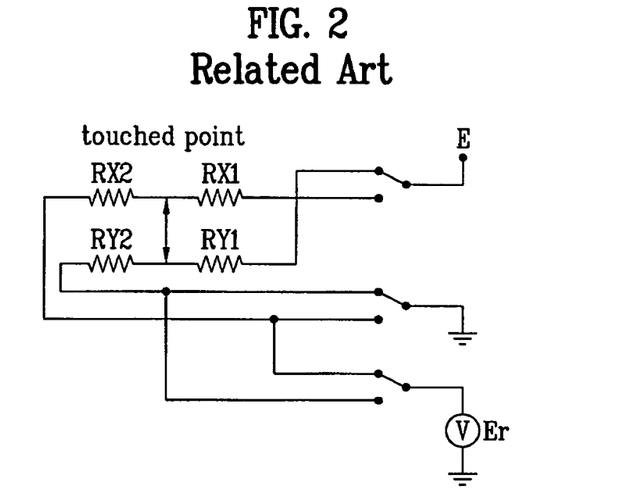
FIG. 2 illustrates an equivalent circuit diagram of the touch panel of FIG. 1.

However, when the upper film 12 is inadvertently touched with a pen and a finger at the same time by a user, a double touch may be generated. FIG. 2 is an equivalent circuit diagram of the touch panel of FIG. 1. As shown in FIG. 2, if the pen (finger) is touched at a predetermined point on a resistive type touch panel, voltage values for the X-axis and Y-axis of the predetermined point are obtained as follows.

X-axis voltage$(V)=E\times\{RX2/(RX1+RX2)\}$

Y-axis voltage$(V)=E\times\{RY2/(RY1+RY2)\}$

At this time, 'E' may be an applied voltage such as 5V or 3.3V, 'RX1+RX2' is a resistance of a contact portion with the upper substrate, and 'RY1+RY2' is a resistance of a contact portion with the lower substrate.

Figure 3:
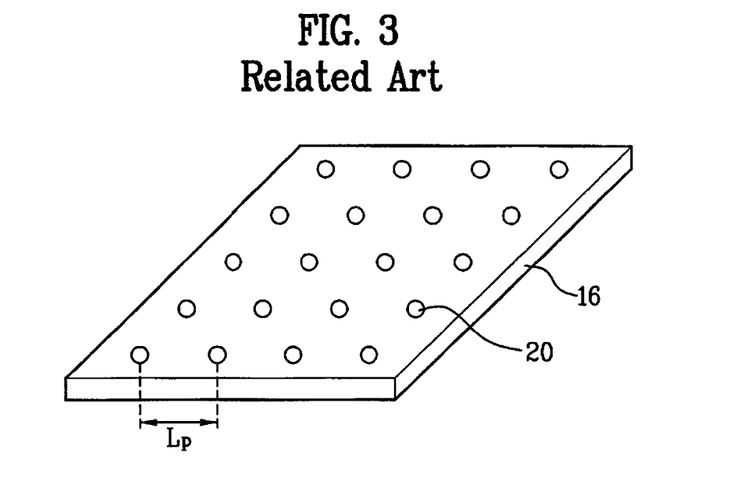
FIG. 3 is a perspective view of dot spacers disposed on one substrate of a resistive type touch panel according to the related art.

FIG. 3 is a perspective view of dot spacers disposed on one substrate of the resistive type touch panel according to the related art. As shown in FIG. 3, the plurality of dot spacers 20 are printed and disposed on the upper film 12 or the lower film 16 at fixed intervals in a resistive type touch panel. FIG. 3 shows the dot spacers 20 formed on the lower film 16. The dot spacers 20 are formed of a UV (ultraviolet rays) curing ink type material. The center-to-center distance (Lp) between the dot spacers is 'Lp=2 mm'. Also, the dot spacer 20 is generally formed as a spherical shape. Typically, the dot spacer 20 is formed of a distorted spherical shape in which a horizontal length 'Ld' (FIG. 4) is relatively longer than a vertical height (not illustrated) of the dot spacer 20. For example, the dot spacer 20 has a horizontal length of about 80 μm.

Figure 4:
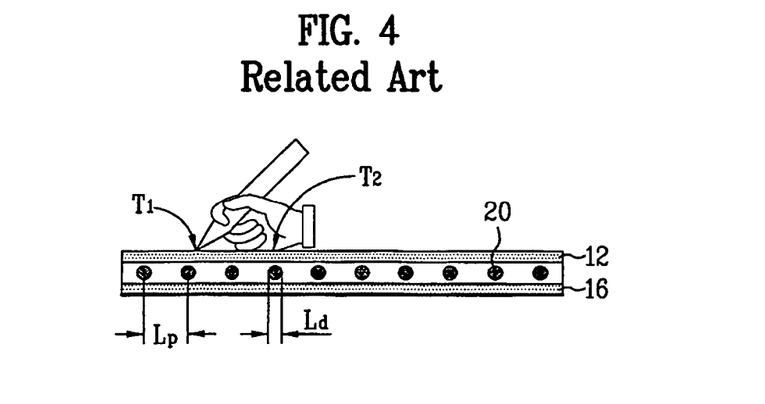
FIG. 4 is a cross sectional view illustrating a double touch scenario involving a resistive type touch panel according to the related art.

FIG. 4 illustrates an example of a double touch that occurs by touching a pen and a portion of a user's hand on the touch panel at the same time. As shown in FIG. 4, the user may touch the touch panel 10 (upper film 12) with the pen and the hand at the same time when the user inputs letters or draws pictures with the pen. In this case, the double touch is detected on the touch panel 10. That is, two touch points of both a pen touch point (T1) and a hand touch point (T2) are generated on the touch panel 10. The pen touch point (T1) and the hand touch point (T2) may be generated by the touch panel 10 at the same time, or sequentially at a predetermined interval.

If the pen touch point (T1) and the hand touch point (T2) are generated at the same time, the touch panel 10 generates the coordinate signal of a middle point between the pen touch point (T1) and the hand touch point (T2). As a result, the touch panel controller 30 and the system 40 utilize the middle point and thereby generate an error in detecting the pen touch point (T1). If the hand touch point (T2) is generated after the pen touch point (T1) within a predetermined interval, the touch panel 10 generates a first coordinate signal for the pen touch point (T1), and then a second coordinate signal for a middle point between the pen touch point (T1) and the hand touch point (T2). If both the first and second coordinate signals are generated within the predetermined interval, such as a 3.4 ms time period, the touch panel controller 30 detects the coordinate value for the second coordinate signal (the middle point), and then provides the same to the system 40. In response, the system 40 generates an error by detecting the middle point as the pen touch point (T1).

Figure 5:
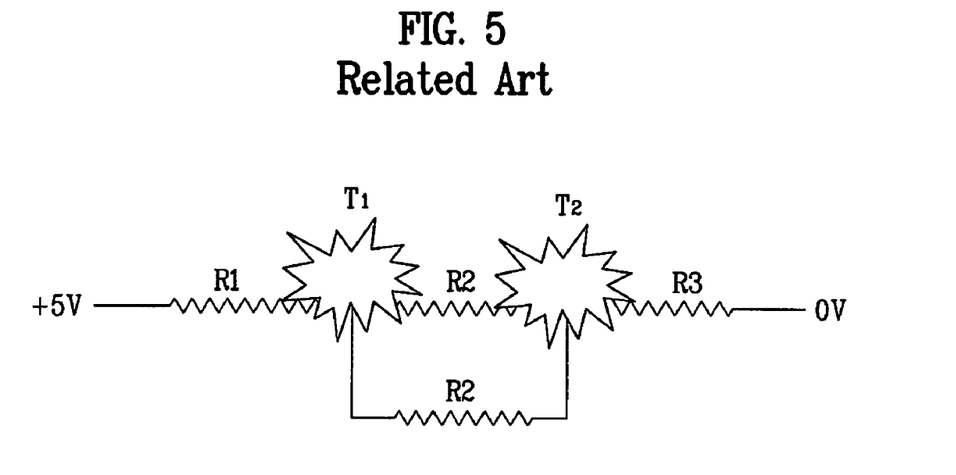
FIG. 5 is an equivalent circuit diagram of a double touch scenario in a touch panel of FIG. 4.

FIG. 5 is an equivalent circuit diagram of the example double touch in the resistive type touch panel of FIG. 4. As shown in FIG. 5, if the double touch of the pen and hand touch points (T1 and T2) are detected together, the middle voltage value of the pen and hand touch points (T1 and T2) is detected as the pen touch point (T1). Electrically, when two points are touched by the pen and the hand, the same resistance R2 is connected between the two points in parallel. For example, supposing that the double touch occurs when 5V (Vcc) is applied to one side of the X-axis or Y-axis electrode bar, and the other side is grounded. At this time, the voltage value of the pen touch point (T1) is, $$\frac{5(R2+R3)}{R1+R2+R3}V,$$

wherein, the relative resistance value is (R2+R3).

The voltage value of the hand touch point (T2) is, $$\frac{5R3}{R1+R2+R3}V,$$

wherein, the relative resistance value is R3.

The voltage value detected by the double touch of the pen and hand touch points is, $$\frac{5(R2+R3)}{2(R1+R2+R3)}V,$$

wherein, the relative resistance value is (R3+R2/2).

In this scenario, the voltage signal of the point having the resistance value (R2/2) between the pen and hand touch points (T1 and T2) is transmitted to the touch panel controller 30 and an undesired coordinate value is generated. Accordingly, there is a need for resistive type touch panels capable of differentiating between actual touches and inadvertent touches.

SUMMARY

A resistive type touch panel includes a display screen having a first substrate and a second substrate. Each of the first and second substrates includes a transparent conductive layer that is on facing surfaces of the first and second substrates. The first substrate may include a first conductive layer and the second substrate may include a second conductive layer. Disposed between the first and second substrates is a plurality of spacers.

The spacers are designed and positioned between the first and second substrates to avoid inadvertent contact between the first and second conductive layers when the first substrate is deformed during operational use of the touch screen. During operation, touching the display screen with an activation force may cause deformation of the first substrate resulting in contact between first and second conductive layers. Contact between the first and second conductive layers results in the generation of coordinates indicative of the location that the display screen was touched. By minimizing inadvertent contact, generation of erroneous coordinate information can be minimized.

Distinguishing the difference between a desired touch and an inadvertent touch may be realized using the spacers. The geometry and positioning of the spacers selectively allows contact between the first and second conductive layers depending on the surface area of the substrate to which the activation force is applied. A concentrated activation force applied with objects having a relatively small surface area, such as a pen, will result in the generation of coordinate location information. Conversely, an activation force applied with an object having a relatively large surface area, such as a portion of a users hand, will be distributed over a larger area of the substrate. Accordingly, a larger number of spacers will be subject to the activation force. As a result, the magnitude of deformation of the substrate will be lessened and contact between the first and second conductive layers may be avoided.

Each of the spacers may be a polygonal column shape such as a hexahedral shape. A first surface of each of the spacers may be positioned contiguous with the conductive layer included with the first substrate. A second surface of each of the spacers may be positioned proximate with the conductive layer included with the second substrate with a space there between. The first and second surfaces may contact the conductive layers when an activation force is applied to the substrate. In addition, each of the spacers may include a third surface perpendicular to the first and second surfaces. A plurality of edge spacers that are positioned adjacent to a periphery of the transparent conductive layers may also be included. The edge spacers may be formed with a hemispherical surface configured to be in contact with one of the transparent conductive layers.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims. It is to be understood that both the foregoing general description and the following detailed description of the present invention are exemplary and explanatory and are intended to provide further explanation of the invention as claimed.

BRIEF DESCRIPTION OF THE DRAWINGS

The inventions can be better understood with reference to the following drawings and description. The components in the figures are not necessarily to scale, emphasis instead being placed upon illustrating the principles of the inventions.

DETAILED DESCRIPTION OF THE EMBODIMENTS

Figure 6:
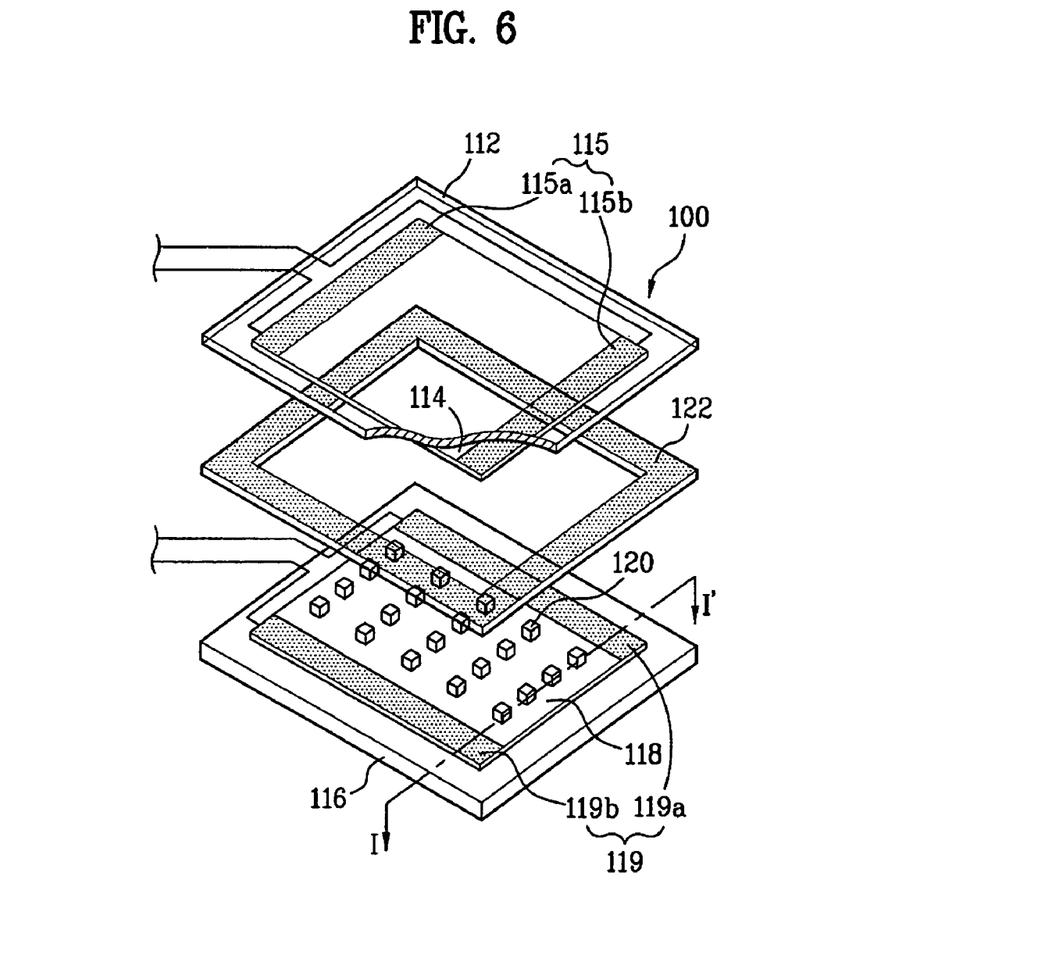
FIG. 6 is a perspective view of a resistive type touch panel.

FIG. 6 is a perspective view of a resistive type touch panel according to the present invention. As shown in FIG. 6, the resistive type touch panel 100 includes an upper substrate 112 and a lower substrate 116. A first transparent conductive layer 114 and a second transparent conductive layer 118 may be formed on facing surfaces of the upper substrate 112 and the lower substrate 116, respectively. The upper substrate 112 is disposed at a predetermined interval or distance from the lower substrate 116.

The upper and lower substrates 112 and 116 may be bonded to each other along a periphery area of the first and second transparent conductive layers 114 and 118. The periphery area may also be referred to as a non-touch area. An adhesive layer may be used to bond the upper and lower substrates 112 and 116 together. The upper and lower substrates 112 and 116 are separated from each other at a distance corresponding to a thickness of the adhesive layer 122 within a touch area.

A plurality of spacers 120 are also included in the resistive type touch panel 100. The spacers 120 may be disposed on the first transparent conductive layer 114 of the upper substrate 112 or the second transparent conductive layer 118 of the lower substrate 116 within the touch area. The spacers 120 may be disposed with equal spacing, or at the same intervals, within the touch area.

The spacers 120 may be formed in a polygonal column shape, such as a rectangular parallelepiped. As compared with dot spacers of a spherical shape, the spacers 120 formed with a polygonal column shape have a first surface, a second surface and a third surface. The first and second surfaces may lie in respective first and second planes that are substantially parallel with the first and second transparent conductive layers 114 and 118, respectively. The first and second surfaces may be substantially equal in area and included a plurality of edges that meet at ninety degree angles to form a square within the respective first and second planes. The third surface may include one or more surfaces each lying in a separate single plane. Each of the one or more third surfaces is perpendicular to each of the first and second surfaces.

In the example illustrated in FIG. 6, each of the spacers 120 are illustrated as cuboids or rectangular parallelpipeds that include three pairs of rectangular faces placed opposite each other and joined at right angles with each other. In this example, the top and bottom of each of the rectangular parallelpipeds represent the first and second surfaces. In addition, one of the sides of the rectangular parallelpiped represents the third surface. In other examples, the spacers 120 may be formed as any polygonal column shape such as a triangular prism, a square pillar, or a pentagonal pillar. Since the spacers 120 are formed in the polygonal column shape, decreases in inadvertent touches may be realized by increasing the contact between the first and second surfaces of the spacers 120 and the upper substrate 112 during an activation force.

The first and second surfaces provide support for upper and lower substrates 112 and 116 when an activation force is applied. An activation force is applied to upper substrate 112 to select an object displayed on the resistive type touch panel. In response to the activation force, the upper substrate 112 will bend, warp, flex or otherwise move toward the lower substrate 116 in the area to which the activation force is applied. As a result, one or more of the first and second surfaces of the spacers 120 contact both the upper and lower substrates 112 and 116 at the same time. The number of spacers 120 contacting both the upper and lower substrates 112 and 116 is based on the area of the upper substrate 112 in which the activation force is applied. For example, an activation force applied to a relatively small area of the upper substrate 112 will cause fewer spacers 120 to contact both the upper and lower substrates 112 and 116. Conversely, an activation force distributed over a larger area of the upper substrate 112 will cause larger numbers of spacers 120 to contact with both the upper and lower substrates 112 and 116.

The amount of deformation or displacement of upper substrate 112 in response to an activation force is based on the number of spacers 120 contacting both the upper and lower substrates 112 and 116. In other words, an area of the upper substrate 112 subject to an activation force will experience deformation that is proportional to the quantity of the first or second surfaces of the spacers 120 supporting that area of the upper substrate 112. An activation force concentrated in a relatively small area of the upper substrate 112 results in support by fewer spacers 120 and therefore a proportionally larger deformation of the upper substrate 112. Conversely, the same activation force distributed over a relatively large area of the upper substrate 112 results in support by a larger number of spacers 120 and therefore proportionally less deformation of the upper substrate 112.

Accordingly, for example, an activation force created by a hand touched on a large area, creates negligible displacement when compared to the displacement caused by the same magnitude of activation force created by a pen touched on a smaller area. Thus, an activation force of a hand must be relatively larger than an activation force of a pen to create similar deformation.

The upper substrate 112 may be formed of a transparent film such as a Polyethylene Terephtalate (PET) film. The lower substrate 116 may be formed of a transparent film, such as a glass substrate or a plastic substrate of the same material as the upper substrate 112. The first and second transparent conductive layers 114 and 118 may be formed of Indium-Tin-Oxide (ITO), Indium-Zinc-Oxide (IZO) and Indium-Tin-Zinc-Oxide (ITZO) or any other material with conductive properties.

The touch panel 100 also includes an X-electrode bar 115 and a Y-electrode bar 119. The X-electrode bar 115 may be in contact with both edges of the first transparent conductive layer 114 to apply a voltage to the first transparent conductive layer 114 along an X-axis direction. The Y-electrode bar 119 may be in contact with both sides of the second transparent conductive layer 118 to apply a voltage to the second transparent conductive layer 118 along a Y-axis direction. The X-electrode bar 115 may include a first X-electrode bar 115a for applying a driving voltage Vcc to flow a current in the first transparent conductive layer 114 along the X-axis direction, and a second X-electrode bar 115b for applying a ground voltage GND. The Y-electrode bar 119 may include a first Y-electrode bar 119a for applying a driving voltage Vcc to flow a current in the second transparent conductive layer 118 along the Y-axis direction, and a second Y-electrode bar 119b for applying a ground voltage GND. The spacers 120 may be disposed on the upper substrate 112 or the lower substrate 116 at fixed intervals.

During operation, when an activation force of sufficient magnitude is applied by touching the upper substrate 112, the first transparent conductive layer 114 is moved into contact with the second transparent conductive layer 118. As a result, a resistance value is varied in the area of the touching point according to a surface resistance of the first and second transparent conductive layers 114 and 118. Due to the varied resistance, the current or the voltage is varied so that the X-axis coordinate signal is output through the first or second Y-electrode bar 119a or 119b being in contact with the second transparent conductive layer 118, and the Y-axis coordinate signal is output through the first or second X-electrode bar 115a or 115b being in contact with the first transparent conductive layer 114. In this example, the touch panel 100 sequentially outputs the X-axis coordinate signal and the Y-axis coordinate signal under control of a touch panel controller (not shown). In other examples, other methods such as parallel outputs of the coordinate signals are possible. In addition, any other methods and/or mechanisms for determining and providing one or more coordinate signals representative of a location of a touch on a resistive type touch panel are also possible in other examples.

The resistive type touch panel 100 includes a touch panel controller (not shown) and a system. The touch panel controller drives the touch panel 100, detects the coordinates according to the coordinate signal of the touch panel 100, and outputs the value of the coordinates to the system as previously discussed. In response to the value of the coordinates from the touch panel controller, the system may perform a corresponding command. In this case, signal lines connected to the X-electrode bar 115 and the Y-electrode bar 119 are connected with the touch panel controller (not shown), whereby the driving voltage is provided to the X-electrode bar 115 and the Y-electrode bar 119.

First Embodiment

Figure 7:
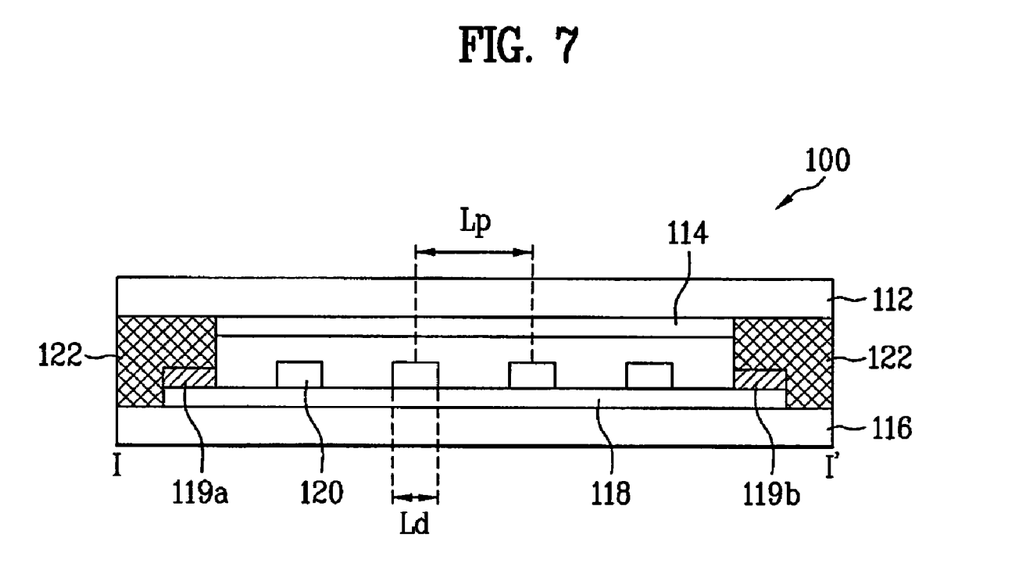
FIG. 7 is a cross sectional view along I-I' of a portion of the resistive touch panel of FIG. 6 according to a first embodiment.

FIG. 7 is a cross sectional view along I-I' of a portion of the resistive type touch panel illustrated in FIG. 6 depicting a first embodiment. In FIG. 7, spacers 120 are disposed on an upper substrate 112 or a lower substrate 116. The spacers 120 may be formed by printing or photo process. The spacers 120 may be disposed on an area of the touch panel with a predetermined center-to-center distance (Lp) between the spacers 120 such as between about 0.5 mm and 0.6 mm. As used herein, the term "about" should be construed to be plus and minus 10% of the measure value, or plus and minus 5% of the measured value unless otherwise indicated.

Each spacer 120 has a predetermined length (Ld) and a predetermined width. The width and the length may be substantially equal, such as between about 40 μm and 50 μm. In addition, each of the spacers 120 may have a predetermined height, such as between about 5 μm and 13 μm. Accordingly, the area of the first and second surface of each of the spacers 120 may be between about 3.8 and 8 times greater than the area of the third surface of each of the spacers 120.

A first transparent conductive layer 114 may be formed on the upper substrate 112. The first and second X-electrode bars 115a and 115b may be formed at the left and right sides of the first transparent conductive layer 114. In FIG. 7, the first and second X-electrode bars 115a and 115b are not shown since the first and second X-electrode bars 115a and 115b are not formed on the line I-I' of FIG. 6. A second transparent conductive layer 118 is formed on the lower substrate 116. The first and second Y-electrode bars 119a and 119b may be formed at the left and right sides of the second transparent conductive layer 118. An adhesive layer 122 may be formed along corresponding portions of the first transparent conductive layer 114 and the first and second Y-electrode bars 119a and 119b. The portions where the adhesive layer 122 is formed may correspond to a non-pixel area of a display screen.

Figure 8:
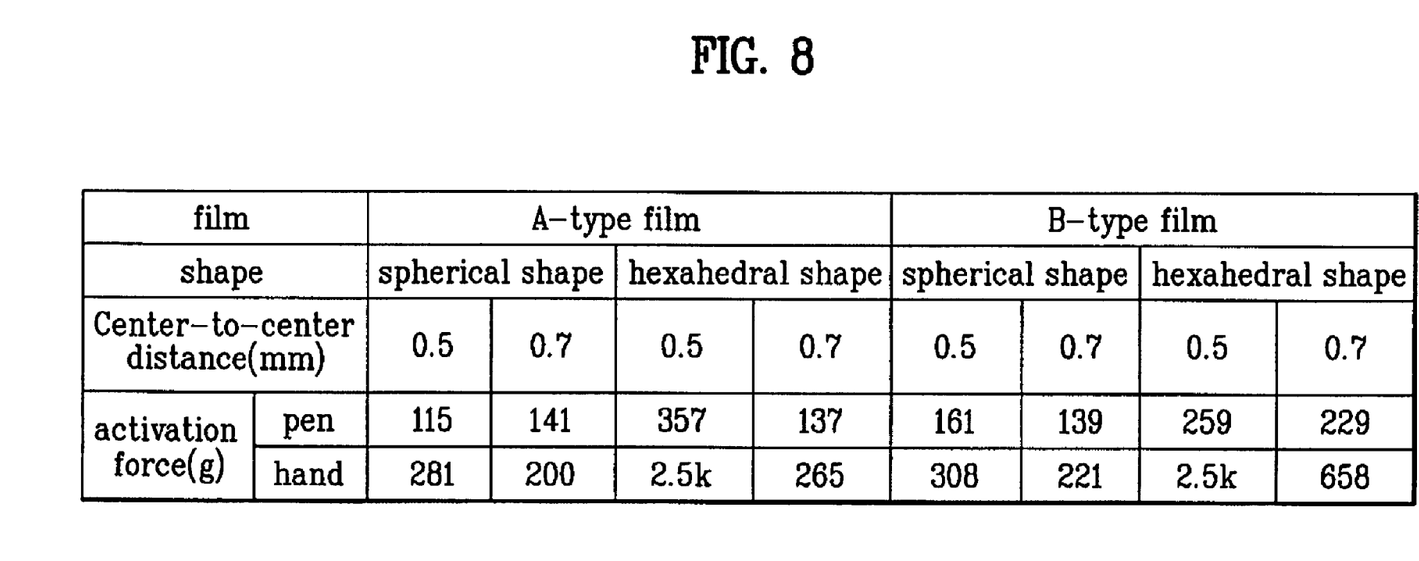
FIG. 8 is a table of showing activation forces of a pen and a hand for different shapes and center-to-center distances of spacers for two kinds of film.

FIG. 8 is a table of example test results showing activation forces of a pen and a hand based on forming the shape of the spacers as either a spherical shape or a hexahedral shape and using two different kinds of film (or substrate). The activation forces shown is the amount force needed to make contact between the first and second transparent conductive layers. As used herein, an activation force is defined as a force created by touch within an area of a substrate. The area within which the activation force is applied varies with the kind of object being used to perform the touch, such as the variation in area between a pen and a hand.

In the example of FIG. 8, the touch panel may have a touched surface formed of an A-type film or a B-type film (or substrate). The A-type film and B-type film may be fabricated to have different levels of flexibility when subject to an activation force. As illustrated in the results of FIG. 8, with similar center-to-center spacing, and regardless of the kind of film, the spacer that is formed as a hexahedral shape provided a greater difference between the activation forces needed by a pen and a hand to make contact between the first and second transparent conductive layers. In addition, it is to be noted that regardless of the kind of film, the center-to-center spacing of 0.5 mm between the spacers formed in a hexahedral shape made the greatest difference between the activation forces by a pen and a hand.

In the case of the A-type film, when the center-to-center spacing between the spacers formed as a hexahedral shape was about 0.5 mm, the greatest difference between the activation forces by a pen and a hand were achieved. In this case, the activation force by the hand (2.5 kg) is six times greater than the activation force by the pen (357 g). Thus, when a double touch of hand and pen occurs, it is possible to ignore the touch by the hand since the pressure of detecting the touch by the hand is significantly greater than the pressure of detecting the touch by the pen.

When using the A-type film and the center-to-center spacing between the spacers formed in a hexahedral shape is about 0.7 mm, the activation force by the hand (265 g) is two times greater than the activation force by the pen (137 g). If using the spacers formed in a spherical shape with the same center-to-center spacing, the activation force by the hand (200 g) and the activation force by the pen (141 g) are much more similar. Thus, using the spacers formed in a hexahedral shape has a greater difference between the activation forces created by a hand and a pen, as compared with using the spacers formed in a spherical shape. Similar results are illustrated in FIG. 8 with the B-type film.

The example test results clearly illustrate that when spacers formed in a hexahedral shape are used, there is significant difference between the activation forces applied by a hand and a pen. Based on the aforementioned experiments, it appears that the resistive type touch panel obtains the most significant differences in activation force between a hand and a pen when the center-to-center distance between spacers formed in a hexahedral shape is between about 0.5 mm and 0.6 mm.

In the previously discussed example resistive type touch panel, the shape of the spacer is a hexahedral shape instead of a spherical shape and the center-to-center spacing between the spacers is selected appropriately. Accordingly, it is possible to configure the resistive type touch panel to ignore the touch of a hand, having a relatively large contact area, while sensitively detecting the touch of pen, having relatively small contact area when the magnitude of activation force is the same in both cases.

Second Embodiment

Figure 9:
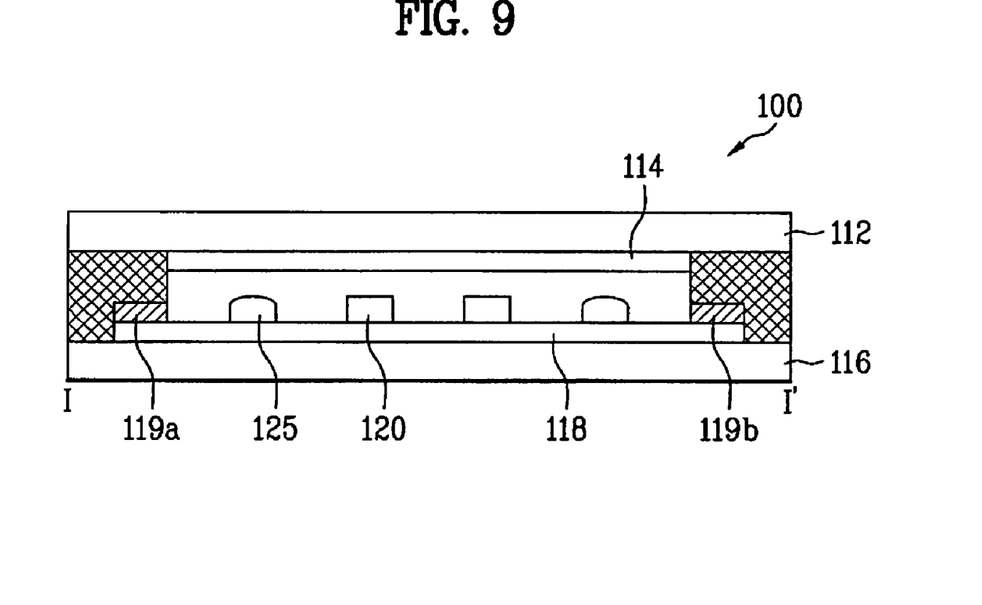
FIG. 9 is a cross sectional view along I-I' of a portion of the resistive touch panel of FIG. 6 according to a second embodiment.

FIG. 9 is a cross sectional view along I-I' of a portion of the resistive type touch panel 100 illustrated in FIG. 6. In FIG. 9, spacers 120 are formed on an area of the lower substrate 116. In addition, the lower substrate 116 includes a plurality of edge spacers 125 disposed adjacent to an X-electrode bar 115 or a Y-electrode bar 119, and adjacent to a periphery of the conductive layers 116 and 118.

The edge spacers 125 are formed to have a hemispherical surface. The hemispherical surface is formed to be in contact with one of the transparent conductive layers 116 and 118 when an activation force is applied. Absent an activation force, the hemispherical surface is positioned proximate one of the transparent conductive layers 116 and 118 with a space there between. With the exception of the edge spacers 125, the resistive type touch panel according to the second embodiment has a similar structure to the resistive type touch panel discussed with reference to FIGS. 6-8.

The edge spacers 125 are positioned near the periphery of the first and second transparent conductive layers 114 and 118 since a polygonal column shape may not be necessary. Even though a user's hand touches the circumference of the touch panel, a user may put his palm on a system bezel or other structural support instead of the substrate. Accordingly, the edge spacers 125 may not experience the activation force provided by a users hand as compared with the spacers 120 positioned away from the periphery of the first and second transparent conductive layers 114 and 118. Referring to FIG. 9, the edge spacers 125 are formed with a hemispherical upper surface having a gentle slope to avoid sharp edges contacting the substrate and/or conductive layers.

Third Embodiment

Figure 10:
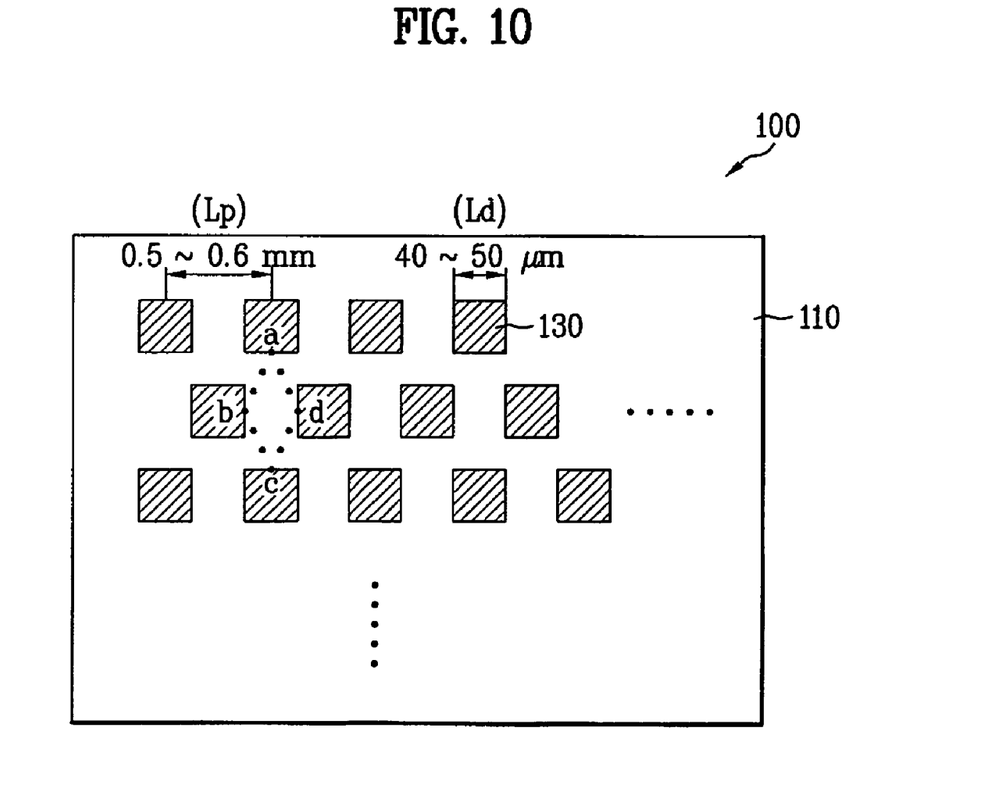
FIG. 10 is a plan view showing an arrangement of spacers in a resistive type touch panel according to a third embodiment.

FIG. 10 is a plan view of a portion of a resistive type touch panel 100 showing a disposition of spacers according to the third embodiment. In the resistive type touch panel 100 shown in FIG. 10, a plurality of spacers 130 may be formed in polygonal column shape, such as a hexahedral shape. Accordingly, the spacers 130 may each have a substantially similar length (Ld) and width that is between about 40 μm and 50 μm, and a height of between about 5 μm and 13 μm.

The spacers 130 may be disposed on one of the first substrate and the second substrate as previously discussed. In addition, the spacers 130 may be distributed in a predetermined pattern so that the spacers 130 are staggered with respect to each other. Accordingly, portions of the predetermined pattern may be configured to resemble a diamond shape (a-b-c-d) as illustrated.

In FIG. 10, the spacers 130 can be grouped into groups of spacers forming a plurality of horizontal lines along a first axis. In a first horizontal line along the first axis, the group of spacers are disposed at fixed intervals to have a center-to-center spacing (Lp) of between about 0.5 mm and 0.6 mm. In a second horizontal line that is parallel with the first horizontal line along the first axis, each of the spacers 130 is positioned to be between two adjacent spacers 130 of the first horizontal line. In a third horizontal line along the first axis, the spacers 130 are disposed at positions that correspond to the position of spacers 130 in the first horizontal line.

In addition, the spacers 130 can be grouped into groups of spacers forming a plurality of vertical lines along a second axis that is perpendicular to the first axis. In the illustrated groups of spacers forming vertical lines along the second axis, center-to-center spacing between adjacently positioned spacers 130 is between about 1.0 mm and 1.2 mm. In other words, the center-to-center spacing between the spacers 130 forming the vertical lines is about twice the center-to-spacing between the spacers 130 forming the horizontal lines. Other than the center-to-center spacing discussed above, the resistive type touch panel according to the third embodiment has a similar structure to the resistive type touch panel according to the first and second embodiments.

As compared with the center-to-center spacing of the spacers describe with reference to FIGS. 6, 7 and 9, the center-to-center spacing of the spacers 130 of FIG. 10 provide a more distributed contact area of the surfaces of the spacers 130 with the upper substrate 112. Thus, support during activation forces is more robust in the resistive type touch panel 100 of FIG. 10. Accordingly, activation forces applied to a relatively large area can be of higher activation force than in the embodiments of FIGS. 6, 7 and 9 due to the staggered positioning of the spacers 130. In other words, the spacers of 130 will proportionally provide more support of the upper substrate during an activation force so that more activation force will be necessary to create contact between the first and second transparent conductive layers when the activation force is distribute over an area of the substrate.

In the previously discussed embodiments of the resistive type touch panel, the shape of the spacers is a polygonal column shape. The polygonal column shape includes first and second surfaces that provide for improved support during an activation force distributed over a relatively large area while still insuring accurate detection of an activation force distributed over a smaller area. In addition, the center-to-center spacing and locations of the spacers provide improved detection accuracy. Accordingly, an activation force inadvertently provided by the hand of a user is less likely to be detected, while an activation force purposefully provided with a pen is more likely to be detected. Thus, use of the spacers formed in a polygonal column shape and a provide a hand rejection function to avoid inadvertent touches. In addition, when the spacers are positioned to be staggered with respect to each other, support for distributed activation forces may be further improved without detrimentally affecting the sensitivity of concentrated activation forces.

While various embodiments of the invention have been described above, it will be apparent to those of ordinary skill in the art that many more embodiments and implementations are possible and within the scope of the invention. Accordingly, the invention is not to be restricted except in light of the claims and their equivalents.

What is claimed is:

1. A resistive type touch panel comprising:
   first and second substrates aligned to be facing each other and having transparent conductive layers on facing surfaces of the first and second substrates;
   a plurality of spacers configured to be in contact with both transparent conductive layers on facing surfaces of the first and second substrates when an activation force is applied to the resistive type touch panel;
   wherein the plurality of spacers include a plurality of inward spacers, each of a hexahedral shape, disposed away from an edge area of the transparent conductive layers and disposed between the transparent conductive layers, wherein each of the inward spacers has an upper planar surface and a lower planar surface which have the same area;
   wherein the plurality of spacers include a plurality of edge spacers disposed adjacent to an edge area of the transparent conductive layers, wherein each of the edge spacers has a top surface of a hemispherical shape and each of the edge spacers has a vertical side surface;
   wherein all of the plurality of inward spacers and all of the plurality of edge spacers are positioned to be spaced away from one of the transparent conductive layers and to be in contact with the other of the transparent conductive layers when the activation force is not applied to the resistive type touch panel;
   wherein the inward spacers and the edge spacers have a minimum ratio of spacer diameter to center-to-center distance between spacers of about 0.06, and a maximum ratio of spacer diameter to center-to-center distance between spacers of about 0.10 and where the center-to-center distance between the inward spacers is between about 0.5 mm and 0.6 mm;
   wherein each of the inward spacers has a substantially equal length and width that is between about 40 μm and 50 μm, and a height of between about 5 μm and 13 μm;

wherein the activation force by a hand is more than two times greater than that by a pen, wherein the activation force by the hand is between about 2.81 g to 2.5 k and the activation force by the pen is between about 115 g to 357 g;

wherein the hemispherical surface of the edge spacer is configured to be in contact with the one transparent conductive layer when a touch input is applied to the edge area;

a pair of Y-electrode bars, wherein:
the transparent conductive layers comprise a narrow transparent conductive layer and a wide transparent conductive layer having different widths, and
the pair of Y-electrode bars are disposed adjacent to both sides of the narrow transparent conductive layer and each of the pair of Y-electrode bars has a width substantially equal to a difference of the widths of the narrow and the wide transparent conductive layers; and an adhesive layer formed as a shape of closed-loop along an outer area of the edge spacers between the first and second substrates.

2. The resistive type touch panel of claim 1, wherein the inward spacers and edge spacers are formed by a printing or a photo process.

3. The resistive type touch panel of claim 1, wherein the inward spacers are formed at equal intervals over an area of at least one of the first or second substrates or combinations thereof.

4. A resistive type touch panel comprising:
a first substrate and a second substrate that are aligned substantially in parallel, wherein each of the first and second substrates include a respective transparent conductive layer;
a plurality of spacers configured to be in contact with both the respective transparent conductive layers of the first and second substrates when an activation force is applied to the resistive type touch panel;
wherein the plurality of spacers include a plurality of inward spacers, wherein each of the inward spacers is formed in a hexahedral shape, disposed away from an edge area of the respective transparent conductive layer of each of the first and second substrates and disposed in a predetermined pattern between the respective transparent conductive layer of each of the first and second substrates so that the inward spacers are staggered with respect to each other to provide more support of one of the conductive layer, wherein each of the inward spacers has an upper surface and a lower surface which have the same area;
wherein the plurality of spacers include a plurality of edge spacers adjacent to the edge area of the respective transparent conductive layer of each of the first and second substrates, wherein each of the edge spacers has a top surface of a hemispherical shape and each of the edge spacers has a vertical side surface;
wherein all of the inward spacers and all of the edge spacers are positioned to be spaced away from one of transparent conductive layers and in contact with the other of transparent conductive layers when the activation force is not applied to the resistive type touch panel;
wherein the inward spacers and the edge spacers have a minimum ratio of spacer diameter to center-to-center distance between spacers of about 0.06, and having a maximum ratio of spacer diameter to center-to-center distance between spacers of about 0.10 and where a first center-to-center distance between the inward spacers that are positioned to form a first line is between about 0.5 mm and 0.6 mm;
wherein each of inward spacers has a substantially equal length and width that is between about 40 μm and 50 μm, and a height of between about 5 μm and 13 μm;
wherein the activation force by a hand is more than two times greater than that by a pen, wherein the activation force by, the hand is between about 281 g to 2.5 k and the activation force by the pen is between about 115 g to 357 g;
wherein the hemispherical surface of each of the edge spacers is configured to be in contact with the one transparent conductive layer when a touch input is applied to the edge area;
a pair of Y-electrode bars, wherein:
the respective transparent conductive layers of the first and second substrates have different widths, and
the pair of Y-electrode bars are disposed adjacent to both sides of a narrower transparent conductive layer between the respective transparent conductive layers having different widths and each of the pair of Y-electrode bars has a width substantially equal to a difference of the widths of the respective transparent conductive layers having different widths; and
an adhesive layer formed as a shape of closed-loop along an outer area of the edge spacers between the first and second substrates.

5. The resistive type touch panel of claim 4, wherein the inward spacers and the edge spacers are formed by a printing or a photo process.

6. The resistive type touch panel of claim 4, wherein a second center-to-center spacing between the inward spacers positioned to form a second line that is perpendicular to the first line is between about 1.0 mm and 1.2 mm.

7. The resistive type touch panel of claim 4, wherein, a first group of spacers are disposed at a pre-determined center-to-center distance to form a first line, and a second group of spacers are disposed at the pre-determined center-to-center distance to form a second line that is parallel with the first line, wherein the spacers in the second group of spacers are positioned to be staggered with respect to the spacers in the first group of spacers.

8. The resistive type touch panel of claim 7, wherein, the first line and second line each comprise a plurality of lines formed in parallel along a first axis and wherein spacers in the first and second lines also form respective third and fourth parallel lines along a second axis that is perpendicular with the first axis.

9. A resistive type touch panel comprising:
a first substrate having a first conductive layer;
a second substrate having a second conductive layer, wherein the first conductive layer is spaced away from second conductive layer and is deformable to selectively contact the second conductive layer;
a plurality of spacers configured to be in contact with both the first conductive layer and the second conductive layer when an activation force is applied to the resistive type touch panel;
wherein the plurality of spacers include a plurality of inward spacers, wherein each of the inward spacers is formed in a hexahedral shape, disposed away from an edge area of the first and second conductive layers and disposed between the first and second conductive layers, wherein each of the inward spacers includes a first surface positioned proximate to and spaced away from the first conductive layer, a second surface positioned to be contiguous with the second conductive layer and a third surface extending between and perpendicular to the first and second surfaces, wherein the first surface and the second surface of each inward spacer has the same area to each other, and wherein a first length of the third surface is about similar to the distance that the first conductive layer is spaced away from the second conductive layer and a second length of the third surface is about similar to a length of both the first and second surfaces;

wherein the plurality of spacers include a plurality of edge spacers disposed near the edge area of the first and second conductive layers, wherein each of the edge spacers include a fourth surface positioned contiguous with the second conductive layer, a fifth surface is perpendicular to the fourth surface and a sixth surface that is a hemispherical surface positioned proximate to and spaced away from the first conductive layer and wherein each of the edge spacers has a vertical side surface;

wherein all of the plurality of inward spacers and all of the plurality of edge spacers are positioned proximate to and spaced away from the first conductive layer and positioned to be contiguous with the second conductive layer when the activation force is not applied to the resistive type touch panel;

wherein the inward spacers and the edge spacers have a minimum ratio of spacer diameter to center-to-center distance between spacers of about 0.06, and having a maximum ratio of spacer diameter to center-to-center distance between spacers of about 0.10 and wherein the center-to-center distance between the inward spacers is between about 0.5 mm and 0.6 mm;

wherein each of inward spacers has a substantially equal length and width that is between about 40 μm and 50 μm, and a height of between about 5 μm and 13 μm;

wherein the activation force by a hand is more than two times greater than that by a pen, wherein the activation force by the hand is between about 281 g to 2.5 k and the activation force by the pen is between about 115 g to 357 g;

wherein the hemispherical surface of edge spacer is configured to be in contact with the second first conductive layer when a touch input is applied to the edge area;

a pair of Y-electrode bars, wherein:
the second transparent conductive layer has a width smaller than a width of the first transparent conductive layer, and
the pair of Y-electrode bars are disposed adjacent to both sides of the second transparent conductive layer and each of the pair of Y-electrode bars has a width substantially equal to a difference of the widths of the first and second transparent conductive layers; and an adhesive layer formed as a shape of closed-loop along an outer area of the edge spacers between the first and second substrates.

10. The resistive type touch panel of claim 9, wherein the first and second surfaces have an area that is substantially equal.

11. The resistive type touch panel of claim 9, wherein the first surface lies in a single plane that is substantially parallel with the first conductive layer and the second surface lies in a single plane that is substantially parallel with the second conductive layer.

12. The resistive type touch panel of claim 9, wherein the first surface lies in only one first plane and the second surface lies in only one second plane that is parallel with the first plane.

13. The resistive type touch panel of claim 9, wherein the first and second surfaces include a plurality of edges that meet at ninety degree angles.

14. The resistive type touch panel of claim 9, wherein the third surface is a plurality of surfaces each lying in a respective single plane.

15. The resistive type touch panel of claim 9, wherein the area of the first and second surfaces is between about 3.8 and 8 times greater than the area of the third surface.

16. The resistive type touch panel of claim 9, wherein the inward spacers are configured to resist deformation of the first substrate in response to a distributed activation force and configured to allow deformation of the first substrate in response to a concentrated activation force of the same magnitude.

* * * * *